Jan. 12, 1965   J. N. METHVEN   3,165,335
AUTOMATIC FIFTH-WHEEL COUPLER
Filed March 11, 1963   4 Sheets-Sheet 1

JAMES N. METHVEN
INVENTOR.

BY *Reed & Berry*

ATTORNEYS

JAMES N. METHVEN
*INVENTOR.*

BY *Seed & Berry*

ATTORNEYS

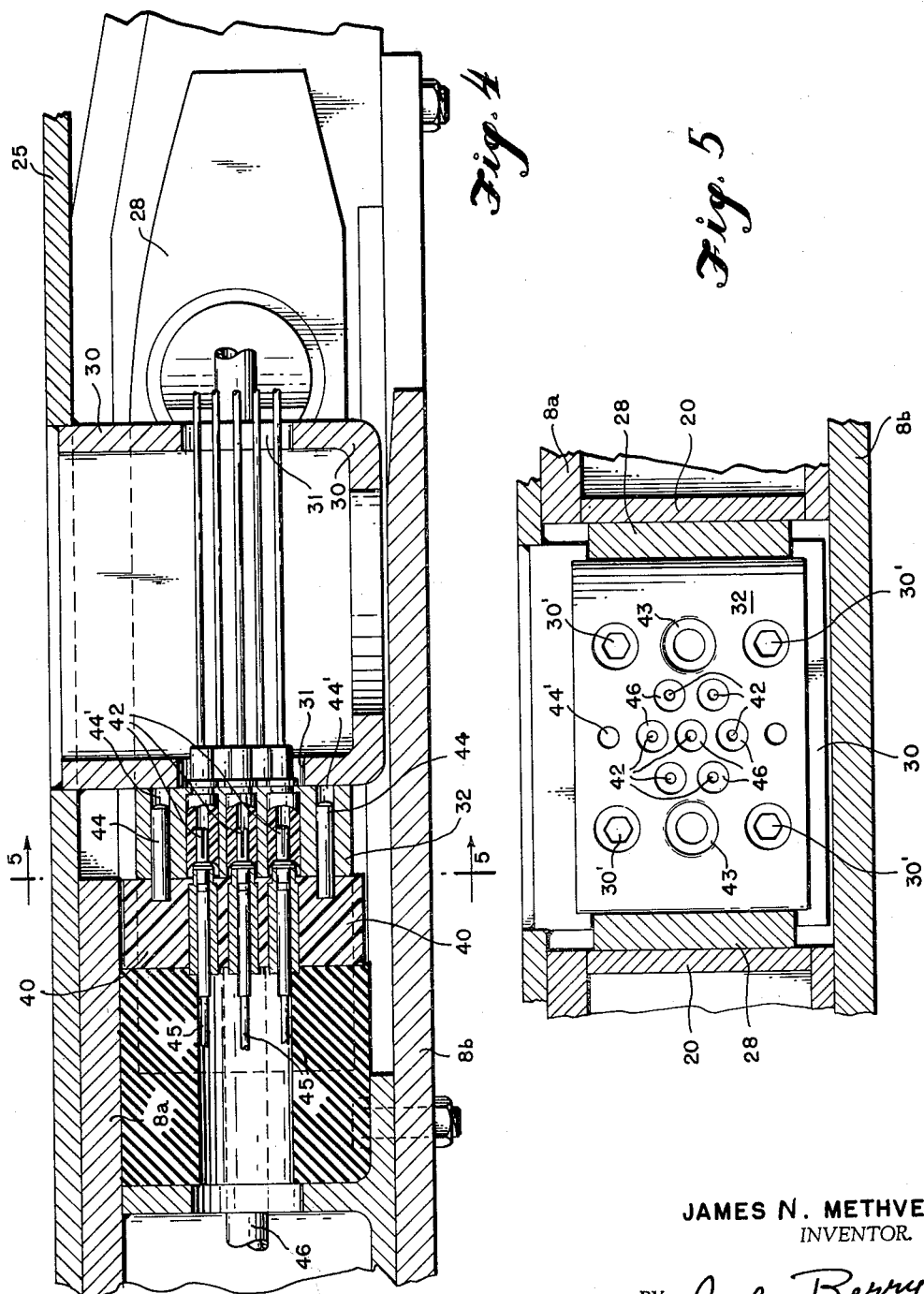

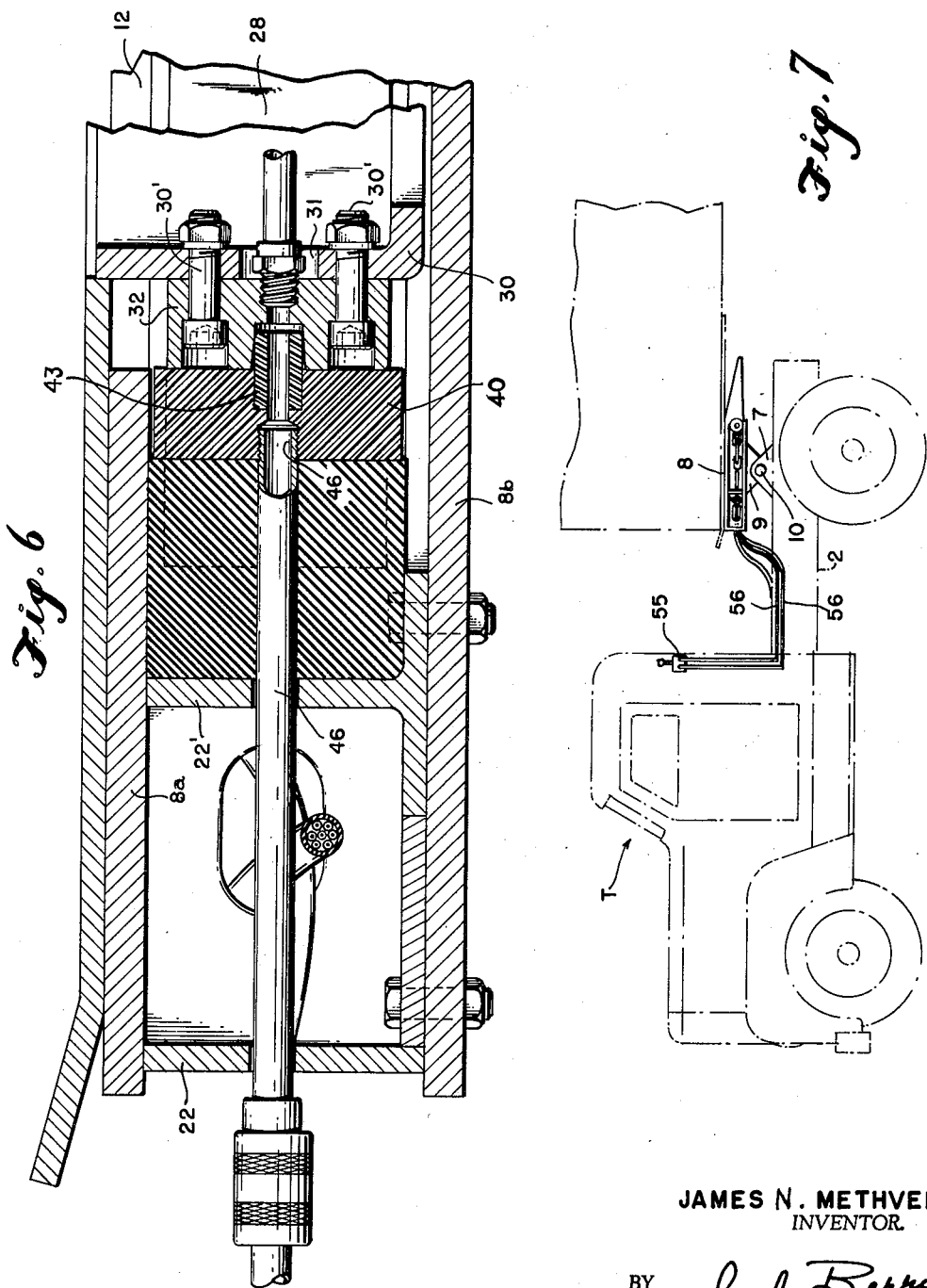

United States Patent Office 3,165,335
Patented Jan. 12, 1965

3,165,335
AUTOMATIC FIFTH-WHEEL COUPLER
James N. Methven, Vancouver, British Columbia, Canada, assignor to Johnston Terminals Limited, Vancouver, British Columbia, Canada
Filed Mar. 11, 1963, Ser. No. 264,234
5 Claims. (Cl. 280—421)

This invention relates to "service couplings," particularly as employed for connecting a semi-trailer vehicle with an automotive tractor, or for making releasable connections between various types of vehicles where an articulated connection is required or desired.

More particularly, this invention pertains to novel features and improvements residing in the details and combination of parts of a fifth-wheel construction that adapts it for the embodiment therein of special devices for the automatic connection and disconnection of brake lines, hydraulic lines, electrical conductors, and the like, as extended between the tractor and trailer units and/or between trailer and trailer units in forming a fully articulated vehicular combination that is completely sustained by the tractor unit in so far as control and operation of brakes, lights and other auxiliaries of the trailer unit is concerned.

It is the principal object of this invention to provide a novel fifth-wheel construction of the character above stated, characterized by the improved features involved in the coupling member or king pin that serves to anchor the semi-trailer to the fifth-wheel parts as mounted by the tractor unit; in the provision of cooperating locking bolts for the functional securement of the coupler or king pin upon its entering the slot or throat of the fifth-wheel plate and in the means for and manner of automatically effecting the connections required between electric lines, pressure lines, brake lines and other auxiliaries that extend between tractor and trailer units, incident to the joining of the tractor and semi-trailer units.

Another object of the invention resides in the provision of a special form of "bull nose" facing on the coupling king pin element as applied to the semi-trailer unit.

Further objects and adavntages of the invention reside in the details of construction and combination of the various parts embodied in the fifth-wheel and parts directly associated therewith.

In accomplishing the above mentioned and other objects of the invention, I have provided the improved details of construction, the preferred forms of which are illustrated in the accompanying drawings, wherein—

FIG. 4 is an enlarged vertical sectional, taken on line 4—4 in FIG. 3.

FIG. 5 is a cross-section taken on line 5—5 in FIG. 4.

FIG. 6 is an enlarged sectional detail taken on line 6—6 in FIG. 3.

FIG. 7 is a side elevation of the tractor and semi-trailer units as joined by the present service coupling.

Figure 2:
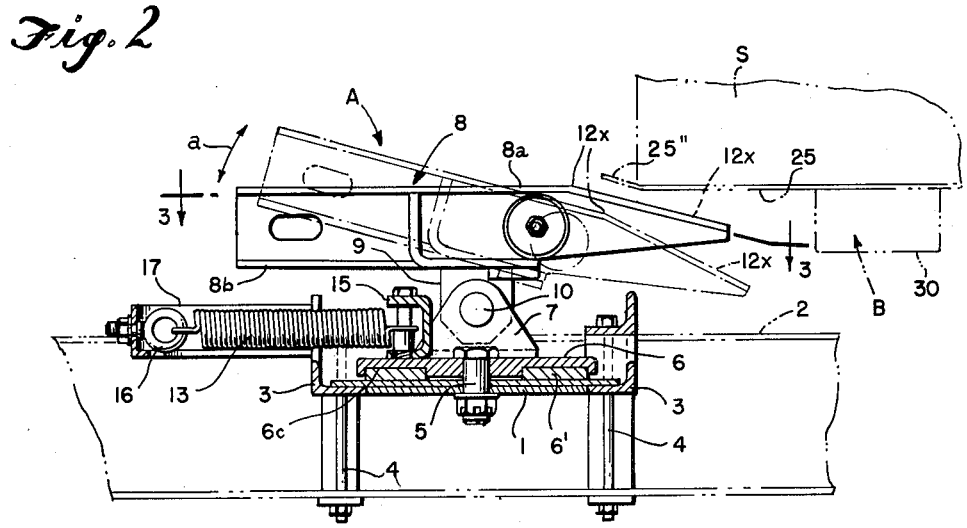
FIG. 2 is a full-line, vertical section on the center line of the fifth-wheel structure seen in FIG. 1 and a fragmental dash line showing the forward end portion of the semi-trailer, as positioned for connection of its king pin with the fifth-wheel as applied to the tractor unit.

Referring more in detail to the drawings:

The service coupling of this invention comprises what I have herein referred to as the "trailer kit," designated in its entirely in FIG. 2 by reference character B, and the "tractor kit," designated in its entirety in that same view by reference character A.

Figure 1:
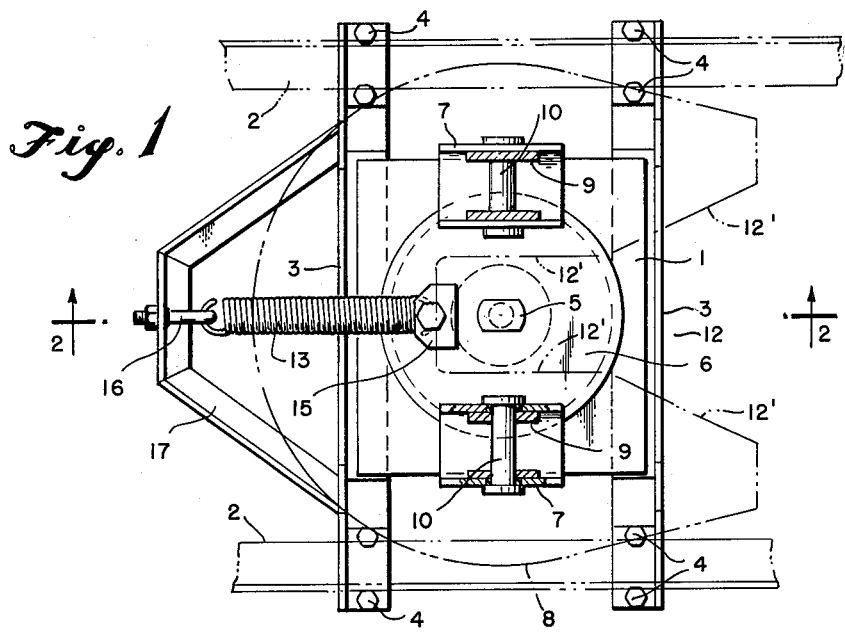
FIG. 1 is a top view of those parts of the present "service coupling" embodied in its fifth-wheel structure, as mounted directly on the body frame of the tractor unit showing its top plate outlined in dash lines for clarity.

The tractor kit as shown best in FIG. 2, comprises a horizontally disposed base or mounting plate 1 that is rigidly supported centrally between the opposite side beams 2—2 of the tractor unit T, by and between two transversely extended angle bars 3—3 that are fixedly secured at their opposite ends to the side beams 2—2 by bolts 4, as shown in FIGS. 1 and 2.

Mounted centrally on the base plate 1 for pivotal turning about a vertical pivot bolt 5 applied therethrough and through plate 1 is a circular, horizontal turntable disc 6 to which, at transversely and diametrically aligned points, are upwardly opening U-shaped brackets 7—7 welded thereto for the mounting thereby of the present fifth-wheel structure, which has been designated in its entirety in FIG. 2 by reference numeral 8. This fifth-wheel structure comprises vertically spaced upper and lower face plates 8a and 8b that are substantially alike in formation, as will presently be explained, and are rigidly joined in their parallel vertically spaced relationship by an intermediate structure of novel formation presently described.

Welded to the bottom face plate of the fifth-wheel 8 and projecting downwardly therefrom, at diametrically opposite sides of its center point, for its rocking support, are laterally spaced legs 9—9 where they are secured by horizontal pivot pins 10—10 to the U-shaped brackets 7—7 on the disc 6 to provide for a desired amount of tilting action of the fifth-wheel, as a unit, as has been indicated by the arrow -a- placed adjacent thereto in FIG. 2. The supporting pivot pins 10—10 are shown in FIG. 1 to be in transverse, axial alignment and are preferably mounted in their respective brackets by resilient bushings.

Figure 3:
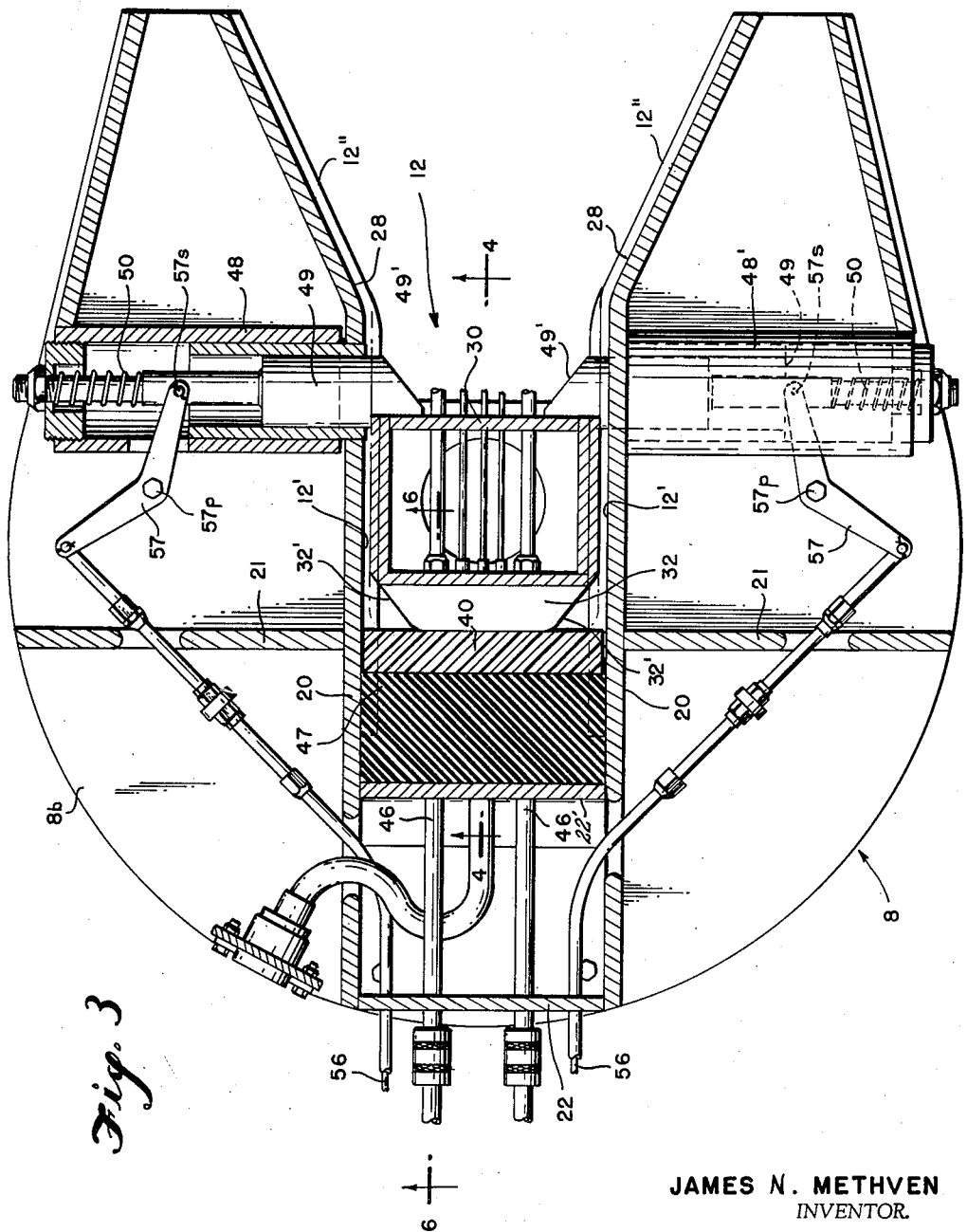
FIG. 3 is an enlarged, horizontal section taken in the plane of line 3—3 in FIG. 2.

In plan, the upper and lower plates 8a and 8b of the fifth-wheel 8, are of substantially circular formation, as shown in FIGS. 1 and 3 and are so mounted on the disc 6 that their centers are subtantially vertically aligned, with the center of the turntable disc 6 and its pivot bolt 5. Each plate is formed with a slot or recess 12 that extends thereinto from its rear edge to a point somewhat forward of its center. These slots are of like size and have defining opposite side edges 12' that extend in parallel relationship in the medial portions of the plates and merge with diverging rear edges 12" to form flared, widened mouths openings rearwardly from the fifth-wheel. The top plate 8a of the fifth-wheel is inclined downwardly from its main body portions, as at 12x in FIGURE 2, as is usual in the formation of such plates. Normally, the fifth-wheel 8 will assume the rearwardly and downwardly inclined dash-line position of FIG. 2 when not supporting the semi-trailer thereon, but is automatically moved to the normal horizontal full line position of that view in making a trailer connection.

It will be understood by reference to FIGS. 1 and 2, that the fifth-wheel 8 normally is positioned with the plate slots 12 opening directly rearward. However, it has limited turning movement about pivot 5 in opposite directions to accommodate it to the position of the trailer unit in making a service connection; this being made possible by reason of the pivotal mounting of the turntable disc 6 by means of pivot bolt 5. The normal position of the disc 6 is shown in FIG. 1 as yieldingly maintained by means of a coil spring 13 which is secured, under tension, at one end to a bracket 15 that is rigidly fixed on the forward portion of the disc 6 as shown in FIG. 2, and at its other end is anchored by an eye bolt 16 to the forward end portion of an outrigger frame 17 or a similar structure that is rigidly fixed to and extends forwardly from the forward cross bar 2 which is a part of the fifth-wheel support.

It is further to be noted that the turntable disc 6 is augmented in its securement for turning movement on plate 1, by the provision in its under surface, of an annular channel 6c, centered about the pivot bolt 5 and in which channel a flat, annular plate 6' that is fixed to plate 1, is received as a mounting track for the disc 6.

The fifth-wheel structure 8 of this particular invention comprises the top plate 8a and the lower plate 8b; these plates being rigidly joined in vertically spaced relationship, and in axial coincidence by longitudinal flanges 20—20, best shown in FIG. 3, that are extended closely along opposite sides of the defining edges of the throat or slots 12 from the rear edges of the plates to their forward edges. The plates 8a and 8b are additionally joined and supported by transversely directed flanges 21—21 at the outsides of the flanges 20—20 and transverse bulkheads 22—22' applied between the flanges 20—20 forwardly of the closed end of slot 12. This manner of joining and spacing the plates of the fifth-wheel structure defines a sort of enclosure longitudinally and centrally thereof in which the devices for connecting and disconnecting of the air and electrical lines of the articulated units, are contained. These connections will be described in detail, after the following description of the trailer kit B.

The "trailer kit" B which has been fully shown in FIG. 2 and in part in FIGS. 3, 4, 5, and 6 comprises a flat, horizontal plate 25 which is permanently attached to the bottom surface of the body structure S of the semi-trailer vehicle. The forward, transverse edge portions of the plate 25 extends slightly forwardly of the semi-trailer body and is upwardly inclined as at 25'.

Fixed to the under side of plate 25, rearwardly of its forward edge, to extend directly downwardly therefrom is the trailer connecting member 30 which herein will be referred to also as the "trailer king pin". This king pin member is so dimensioned that in the connecting of the trailer unit with the tractor unit, it can be received easily in the flared rear end entrance of the plate slot 12 and will move forwardly therein to an easy sliding fit between the opposite, parallel side edges that define the slot, as shown in FIGS. 3, 4, and 5, wherein it is noted that flat guide bars 28—28 are fixed flatly to opposite faces of the slot 12 for the guiding reception of king pin member 30 between them after it has moved into the slot and particularly when entering its more restricted forward end portion, where it will be retained against lateral looseness. It is also to be noted in FIG. 5 that the king pin has its opposite sides contoured to fit the bars 28—28 which are tapered at their rearward ends for easier reception of the pin 30 between them.

Other features of the king pin member 30 resides in its particular formation, as disclosed by its cross-sectional showing in FIGS. 3 through 6. It is to be noted that in these views this member 30 is hollow and of rectangular formation; is disposed vertically and has its upper end fixed securely to the mounting plate 25. The transverse dimension of the member 30 as seen in FIG. 3, is slightly lesser than the width of the forward end portion of the throat or slot 12 of th fifth-wheel plate 8a and it has guiding contact with the guide bars 28—28 as applied to the slot. Horizontally aligned openings 31—31 are formed in the front and rear walls of the member 30, see FIG. 4, through which the electrical and air lines of the trailer unit are extended for joining with fittings or inserts that have complemental lines from the tractor unit.

Fixed to the forward face of the king pin member 30 by a plurality of bolts 30' applied as in FIGS. 5 and 6, is what I have designated a "bull nose" plate 32 which, as shown in FIG. 3, is seen to be formed with inwardly and forwardly inclined opposite side edges 32' for the easier and guided entrance of member 30 to the slot 12 when a service connection is being made. This plate 32 will be further described later in the specification. Fixed to and extending between the forward ends of the two guide bars 28—28 as applied to the opposite side faces of the plate slot 12, is a terminal block 40 of high strength, electrical insulating material, or of steel in which case the plate would be equipped with inserts of insulating material as presently explained. In this block, a predetermined number of electrical connector pins 42 are set as shown in FIGS. 4 and 5, to project equally from its rearward face. This block 40 also carries two or more molded neoprene nipples 43, see FIG. 4, for operating line connections, as well as a required number of dowel pins 44 which project farther rearwardly than the connector pins 42 and the rubber nipples 43.

The rear face of the terminal block 40 carries a predetermined number of insulated electric cables 45 which are attached to the rear ends of the connector pins 42. Also the required number of pipe nipples 46 for operating line connections are fitted into place and extend forwardly through the bulkheads 22—22' as shown in FIG. 3 from the fifth-wheel structure and are attached at their forward ends through suitable cables, hose lines and the like, to the supply lines leading to the trailing unit, from the tractor unit. Between the rear of the terminal block 40 and the central bulkhead 22' of the fifth-wheel structure, resilient shock absorbing means is interposed, consisting of a rubber block 47 or coil springs. Rearwardly of its center, the fifth-wheel structure incorporates two cylindrical or square tubes 48—48' mounted rigidly therein in transverse axial alignment, one on each side of the throat as shown best in FIG. 3. These tubes contain a pair of sliding bars or dogs 49—49 which are loaded by coil springs 50—50 or other means so that when, in locking position, they project equally beyond the vertical flanges 20—20 into the slot 12 of the fifth-wheel. The protruding tips of these dogs 49 are beveled or shaped to present inclined surfaces 49' to the forward face 32 of the king pin member 30 on its entering the slot 12, so they may be more readily pushed aside and outwardly from the slot until the king pin 30 has fully entered the slot, whereupon they will then be actuated inwardly by their springs 50 or the means, to the locking position of FIG. 3, for the securing of the king pin 30 in place and seated firmly against the cushioning abutment 47.

The retraction of the two pin locking dogs 49—49 for uncoupling the connected units may be accomplished from the cab of the tractor unit T by a hand actuated mechanism 55, operating through push-pull cables 56 leading to the outer ends of bell crank levers 57—57 pivoted in the fifth-wheel, as at 57p in FIG. 3, and which are operatively connected to the locking bars 49 as at 57s or their functional actuation. Alternatively, air cylinders, hydraulic cylinders or electric solenoids may be used in lieu of the parts 55, 56 and 57 to accomplish releasing of the dogs from locking position.

Assuming that the fifth-wheel structure is so constructed and that the tractor and trailer units are in the disconnected relationship of FIG. 2; to effect their articulated connection as in FIGS. 3 and 7, the tractor would be backed sufficiently to cause the trailer king pin 30 to enter the flared end of the fifth-wheel slot 12 and move forwardly therein. As it moves forwardly the "bull nose" face plate 32 of the pin engages the inclined ends of the locking pins 49—49 and pushes them clear of the slot 12 and it then moves forwardly in the slot 12 and against the resilient cushioning block 47. With the final forward movement, the dowel pins 44 enter sockets 44' and guide the plate 32 into proper registration with the block 40.

With the movement of the king pin member 30 to this position, the spring loaded locking dogs are extended to lock it against release. Also, all operating line connections are brought into alignment and are automatically joined.

When it is desired to disconnect the parts, the operator of the tractor unit, through the mediacy of the hand mechanism 55, cables 56 and bell cranks or other remote controls, retracts the dogs 49 and moves the tractor unit forwardly until the disconnecting is effected.

What is claimed is:

1. In a tractor and trailer combination; a tractor kit fixedly applied to the tractor and a trailer kit fixedly applied to the trailer; said kits having complemental parts thereof releasably interfitted in an articulated draft connection; said tractor kit comprising a fifth wheel mounted for turning about a vertical pivot member and having top and bottom plates rigidly joined in spaced coaxial relationship by transversely interposed spacing plates that are formed with companion king pin receiving slots leading forwardly thereinto from their rear edges, a resiliently yieldable abutment block disposed between the top and bottom plates of the fifth wheel, against the rear face of one of said spacing plates and mounting a terminal block thereon in the line of the king pin slots; said trailer kit comprising a mounting plate with a downwardly directed king pin adapted for entering the king pin slots of the fifth wheel in making said draft connection to seat against said terminal block and to be held against axial turning in the fifth wheel slots; said king pin and said terminal block as applied to the yieldable abutment block having complemental service line connectors mounted therein for automatic connection incident to the making of a draft connection, and releasable latch means mounted in the fifth wheel for retaining the articulated draft connection.

2. The combination according to claim 1 wherein the king pin is of rectangular cross sectional form, and has a transverse width corresponding to the width of the inner end portions of said guide slots to prevent its turning therein.

3. A combination according to claim 1 wherein the terminal couplings of the tractor are mounted on the metal terminal block applied to the king pin cushioning block, and the king pin has a bull nose face plate applied to its forward face to engage said metal plate, and has the terminal couplings of the service lines of the trailer mounted therein.

4. A combination according to claim 1 wherein the guide slots as applied to said fifth-wheel are defined between guide plates extending along opposite side edges thereof, said guide plates being shaped to define a flared entrance mouth to the slot, said plates being fixed at the mouth of the slot to said fifth-wheel plates, and supported at their inner ends by said cushioning block and mounting the metal terminal block between them.

5. In a tractor and trailer combination, a tractor kit applied to said tractor and a trailer kit applied to said trailer; said kits comprising parts interfitted on an articulated draft connection; said tractor kit comprising a fifth wheel structure mounted for horizontal turning, and formed with a king pin slot opening to its rear edge; said trailer kit including a mounting plate equipped with a downwardly directed king pin adapted for entering and being seated in the fifth wheel slot in making the articulated connection, complemental service line connectors mounted in the fifth wheel and king pin that are automatically joined in the making of the articulated draft connection, and a pair of transversely aligned, spring pressed latch bolts slidably mounted in the fifth wheel with end portions projecting into said fifth wheel slot from opposite sides thereof to coact in retaining the king pin when seated, a releasing bell crank lever for each latch bolt mounted on the fifth wheel and pull cables extended from said bell cranks to the tractor for effecting movement of said levers for release of said latch bolts, for disconnection of the trailer and tractor connection.

References Cited by the Examiner

UNITED STATES PATENTS

| | | | |
|---|---|---|---|
| 2,092,115 | 9/37 | Gurton | 280—421 |
| 2,094,399 | 9/37 | Fuchs | 280—421 |
| 2,119,460 | 5/38 | Gurton | 280—421 |
| 2,712,948 | 7/55 | Conaway | 280—438 |

A. HARRY LEVY, *Primary Examiner.*

LEO FRIAGLIA, *Examiner.*